(12) United States Patent
Gibbs et al.

(10) Patent No.: US 6,217,226 B1
(45) Date of Patent: Apr. 17, 2001

(54) FIBER OPTIC COUPLING PANEL

(75) Inventors: Gary F. Gibbs, Jonesboro; Albert Allen Gumpert, III, Atlanta; Daniel Lee Stephenson, Lilburn, all of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/271,814

(22) Filed: Mar. 18, 1999

(51) Int. Cl.[7] .................................................. G02B 6/36
(52) U.S. Cl. ............................................. 385/53; 385/139
(58) Field of Search .................................... 385/53–55, 56, 385/59, 76, 71, 134, 140, 139, 135, 33; 174/57

(56) References Cited

U.S. PATENT DOCUMENTS

| | | | |
|---|---|---|---|
| 4,934,785 | 6/1990 | Mathis et al. ................. | 350/96.21 |
| 5,274,729 | 12/1993 | King et al. ..................... | 385/134 |
| 5,969,294 | * 10/1999 | Eberle et al. ................... | 174/57 |
| 6,041,155 | * 3/2000 | Anderson et al. .............. | 385/139 |

* cited by examiner

Primary Examiner—Phan T. H. Palmer

(57) ABSTRACT

A coupling panel for retaining one or more optical fiber couplers that comprises a substantially planar base portion having a front side and a rear side and a plurality of coupler openings that are provided in the base portion and which extend from the rear side to the front side. Each of the coupler openings is sized and configured to receive an optical fiber connector coupler therethrough and includes a coupler attachment mechanism which is sized and configured to releasably hold an optical fiber connector coupler. Each of the coupler attachments has a pair of spaced resilient latch arms having a latch hook thereon for grasping the connector coupler inserted therein.

27 Claims, 6 Drawing Sheets

FIBER OPTIC COUPLING PANEL

FIELD OF THE INVENTION

The invention relates generally to apparatus for coupling optical fibers. More particularly, the invention relates to a coupling panel adapted to support one or more optical fiber couplers.

BACKGROUND OF THE INVENTION

Often times it becomes necessary to arrange a plurality of optical fiber connectors in a coupling panel to facilitate multifiber connections. Typically, devices for holding connectors are mounted in the panel, but the connectors themselves are not connected to incoming or outgoing fiber paths until needed to provide service. Commonly used devices which are used to accommodate interconnections are generally referred to as adaptors or couplers.

In one such prior art arrangement, depicted in FIGS. 1 and 2, a generally elongated coupling panel 10 is used to facilitate optical fiber coupling. The coupling panel 10 is provided with a plurality of coupler openings 12 that are sized and configured to receive an optical fiber connector coupler 14. As is known in the art, the couplers 14 are adapted to receive two optical fiber connectors 16 so that two optical fibers can be coupled therein in abutting relationship. By way of example, and as shown in FIGS. 1 and 2, the optical fiber connectors 16 can be configured as ST® connectors, ST being a registered trademark of the Lucent Technologies, Inc. The ST® connector is disclosed, for example, in U.S. Pat. No. 4,934,785, which was issued on Jun. 19, 1990, in the names of Mathis and Miller. As indicated in FIG. 2, the connector 16 includes a cylindrical ferrule 18 which encapsulates an end portion of an optical fiber 20 to be terminated. The ferrule 18 is shrouded by a cap 22 and is spring-loaded so as to be linearly displaceable relative to the cap. The cap 22 includes one or more latching slots 24 that are adapted to receive latching lugs 26 provided on the connector couplers 14.

As depicted in FIGS. 1 and 2, each connector coupler 14 is generally cylindrical in shape and includes first and second coupling ends 28 and 30. Each of these ends 28, 30 is sized and configured to accept a single optical fiber connector 16. In particular, each end 28, 30 is designed such that the cap 22 of the connector 16 fits over its associated coupling end with the latching lugs 26 disposed within the entrance of a latching slot 24. Once in this position, the connector 16 can be fully attached to the coupler 14 by pushing the cap 22 forwardly and turning it clockwise until each latching lug 26 is securely held with a lock notch 32 formed in each latching slot 24. Formed intermediate the two ends 28, 30 of the connector coupler 14 is an annular flange or ring 34. As shown in FIGS. 1 and 2, this annular ring 34 is defined by an annular outer periphery 36 and by first and second planar sides 38 and 40. When the coupler 14 is disposed within one of the coupler openings 12 provided in the coupling panel 10, the second planar side 40 of the coupler is placed in contact with the exterior surface of the coupling panel.

Also intermediate of the two ends 28, 30 of the connector coupler 14 is a threaded section 42. As depicted most clearly in FIG. 2, the threaded section 42 includes at least one flat portion 44 (FIG. 1) which aids the user in properly aligning the coupler 14 in the coupling panel 10. Each coupler opening 12 therefore similarly is provided with flat portions 46 that are similarly sized and shaped as those of the couplers 14. To secure the coupler 16 in place within the coupling panel 10, a washer 48 and nut 50 typically are threaded onto the threaded section 42 so that, when the nut is fully tightened, the annular ring 34 comes into firm abutment with the coupling panel 10.

Although functional in its present design, the panel system described above has some significant drawbacks. As a first matter, attachment of connector couplers to conventional coupling panels can be problematic and time consuming. Specifically, it is difficult to initially thread nuts onto the connector coupler when the coupler is disposed within a coupling panel. This is particularly true where the coupler openings formed in the coupling panel are closely spaced. Furthermore, a tool such as a wrench is required to fully tighten the nut in place on the coupler and to remove it once fully tightened. In addition to the attachment problems associated with conventional panel systems, the cost of such systems is unnecessarily high due to the need for the additional manufacture of the washers and nuts required to attach each connector coupler.

In view of the above, it can be appreciated that it would be desirable to have a panel system that is adapted to accommodate conventional optical fiber connectors such as ST® connectors, which can be quickly and easily manipulated and which is inexpensive to manufacture.

SUMMARY OF THE INVENTION

The present invention relates to a coupling panel for retaining one or more optical fiber couplers. The coupling panel comprises a substantially planar base portion having a front side and a rear side and a plurality of coupler openings that are provided in the base portion and which extend from the rear side to the front side. Each of the coupler openings is sized and configured to receive an optical fiber connector coupler therethrough. The coupling panel further comprises a plurality of coupler attachment mechanisms, one coupler attachment mechanism being positioned at each of the coupler openings. Each coupler attachment mechanism is sized and configured to releasably hold an optical fiber connector coupler.

In a preferred embodiment, each coupler attachment mechanism includes a pair of opposed latch arms which are adapted to grasp the connector coupler, and each latch arm typically extends outwardly from one side of the coupling panel and includes at least one latch hook that is adapted to retain the connector coupler. Normally, each latch arm further includes a finger tab that facilitates removal of the connector coupler from the coupler attachment mechanism.

The objects, features, and advantages of this invention will become apparent upon reading the following specification, when read in conjunction with the accompanying drawings. It is intended that all such additional features and advantages be included therein with the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 3:
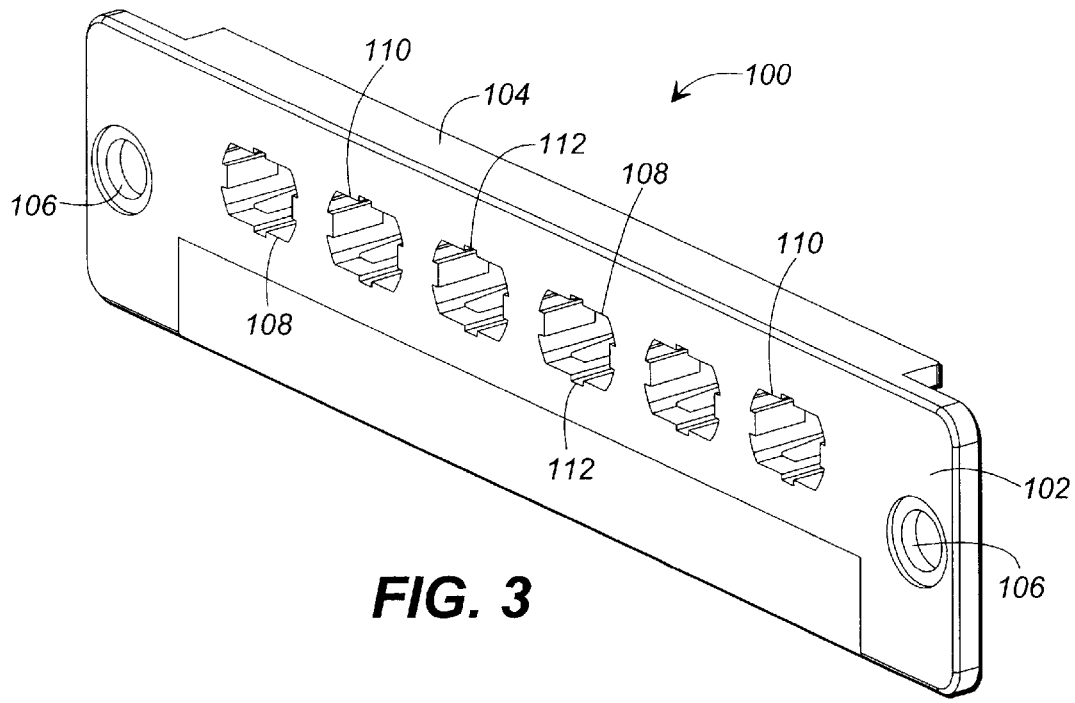
FIG. 3 is a front perspective view of a coupling panel constructed in accordance with the present invention.
Figure 4:
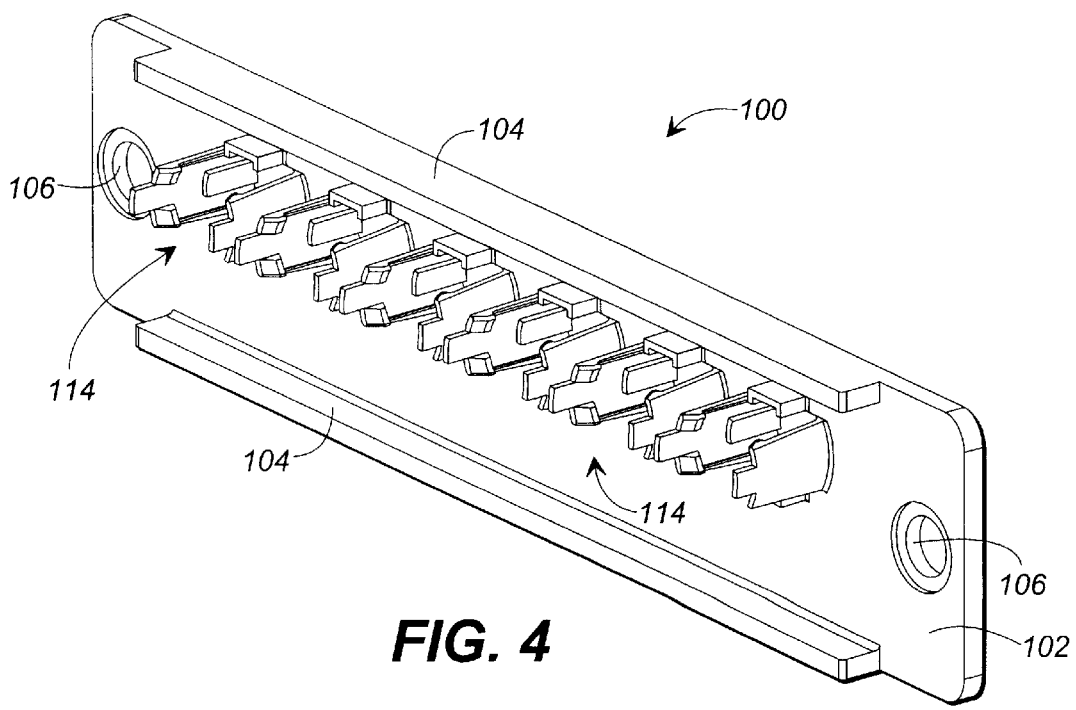
FIG. 4 is a rear perspective view of the coupling panel shown in FIG. 3.

Referring now in more detail to the drawings, in which like numerals indicate corresponding parts throughout the several views, FIGS. 3 and 4 illustrate a coupling panel 100 constructed in accordance with the present invention. As shown in these figures, the coupling panel is substantially rectilinear in shape and includes a substantially planer base portion 102. The base portion 102 normally is composed of a polymeric material. The base portion 102 typically is elongated and includes one or more flanges 104 which provide strength to the base portion. Although provision of these flanges is preferred, it will be appreciated by those having ordinary skill in the art that such flanges are not necessary in cases where the coupling panel is robustly configured or constructed of a material that would render it strong enough for it to withstand the typical forces to which it is subjected. The base portion 102 typically further includes one or more mounting holes 106 which are adapted to receive quick release fasteners (not shown) that are used to mount the panel 100 to a distribution shelf. Although provision of these connection holes 106 is deemed preferable, it is to be understood that alternative means of connecting the panel 100 to the distribution shelf could be used, if desired.

Figure 1:
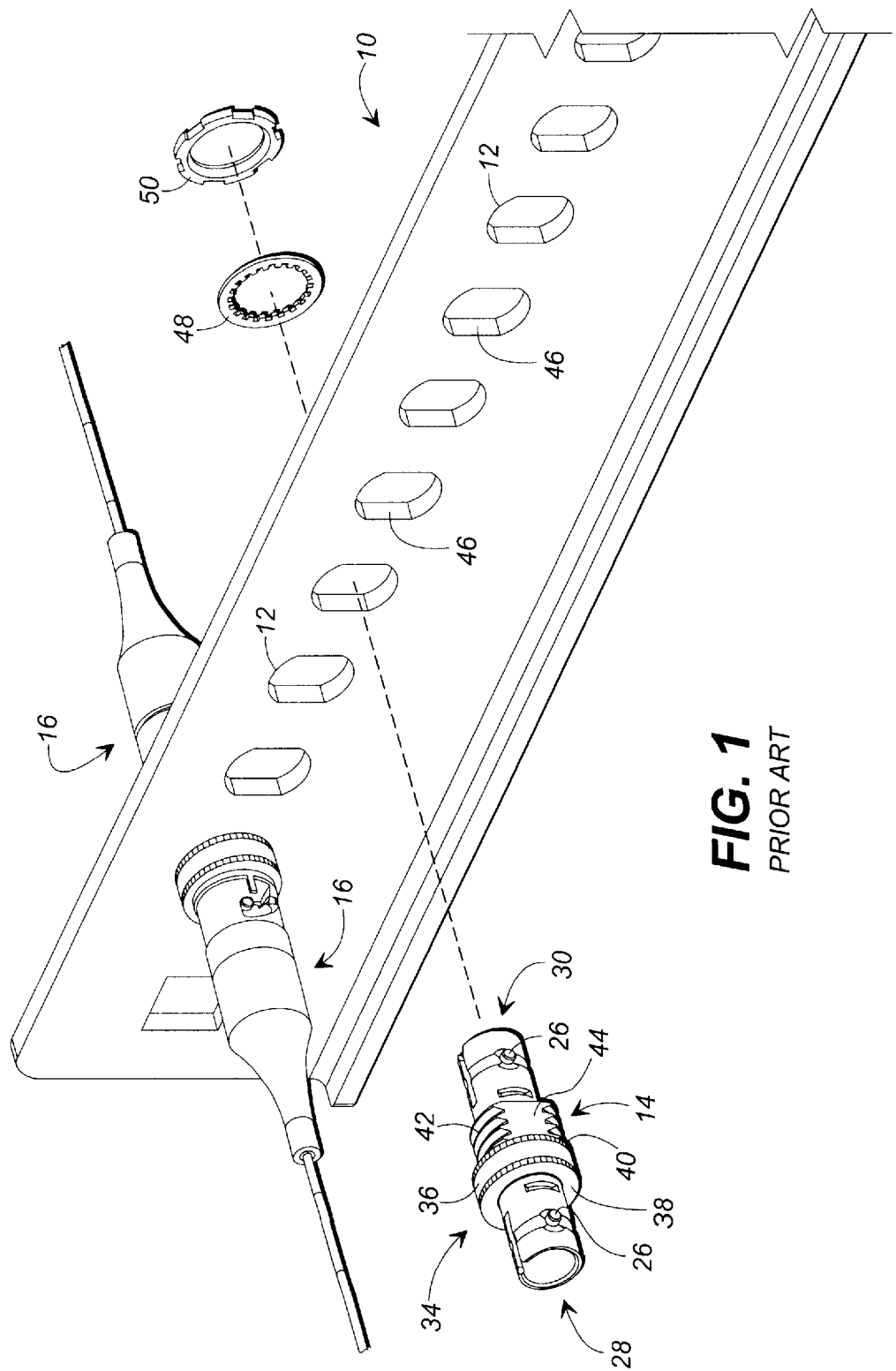
FIG. 1 is a perspective view of a prior art coupling system.
Figure 2:
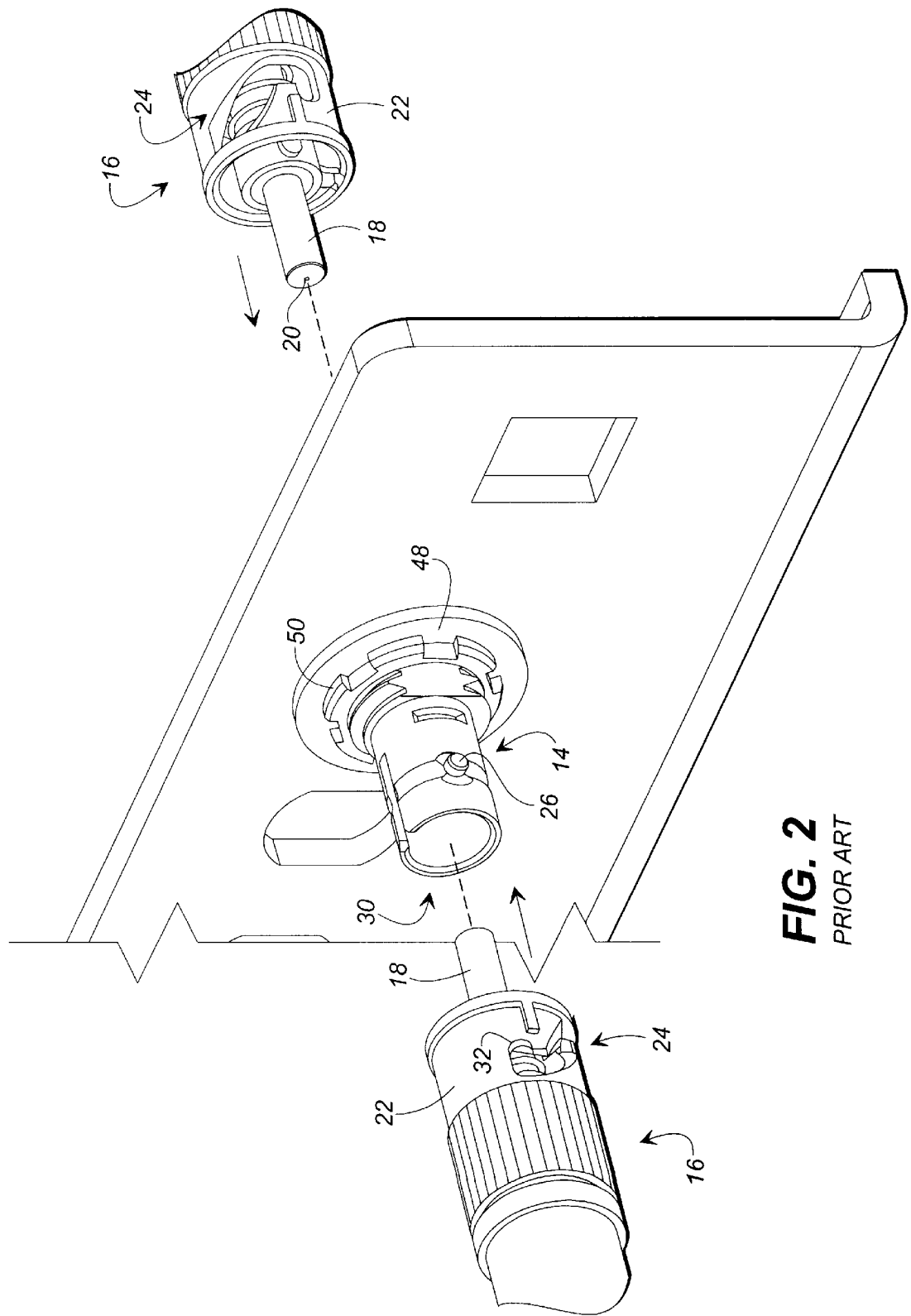
FIG. 2 is a perspective view of the system shown in FIG. 1, depicting coupling of two optical fiber connectors.

Formed along the length of the coupling panel 100 is a plurality of coupler openings 108. By way of example and not limitation, the coupling panel 100 can be provided with six such coupler openings 108 along a medial portion of the panel. Typically, each of the coupler openings is substantially arcuate in shape and provided with one or more flat portions 110 which, as is discussed below, are sized and configured to receive similarly shaped flat portions provided on the connector couplers that are to be received within the coupler openings 108. Normally, these flat portions 110 are provided with keyhole slots 112 that are sized and configured to receive latching lugs provided on the connector couplers. Despite being shown and described as comprising flat portions 110 and keyhole slots 112, it is to be understood that other shapes and configurations could be used depending upon the specific arrangements of the connector couplers used with the coupling panel 100. Most preferably, however, each coupler opening 108 is sized and configured so as to receive an ST® connector 14 such as that depicted in FIGS. 1 and 2.

Figure 5:
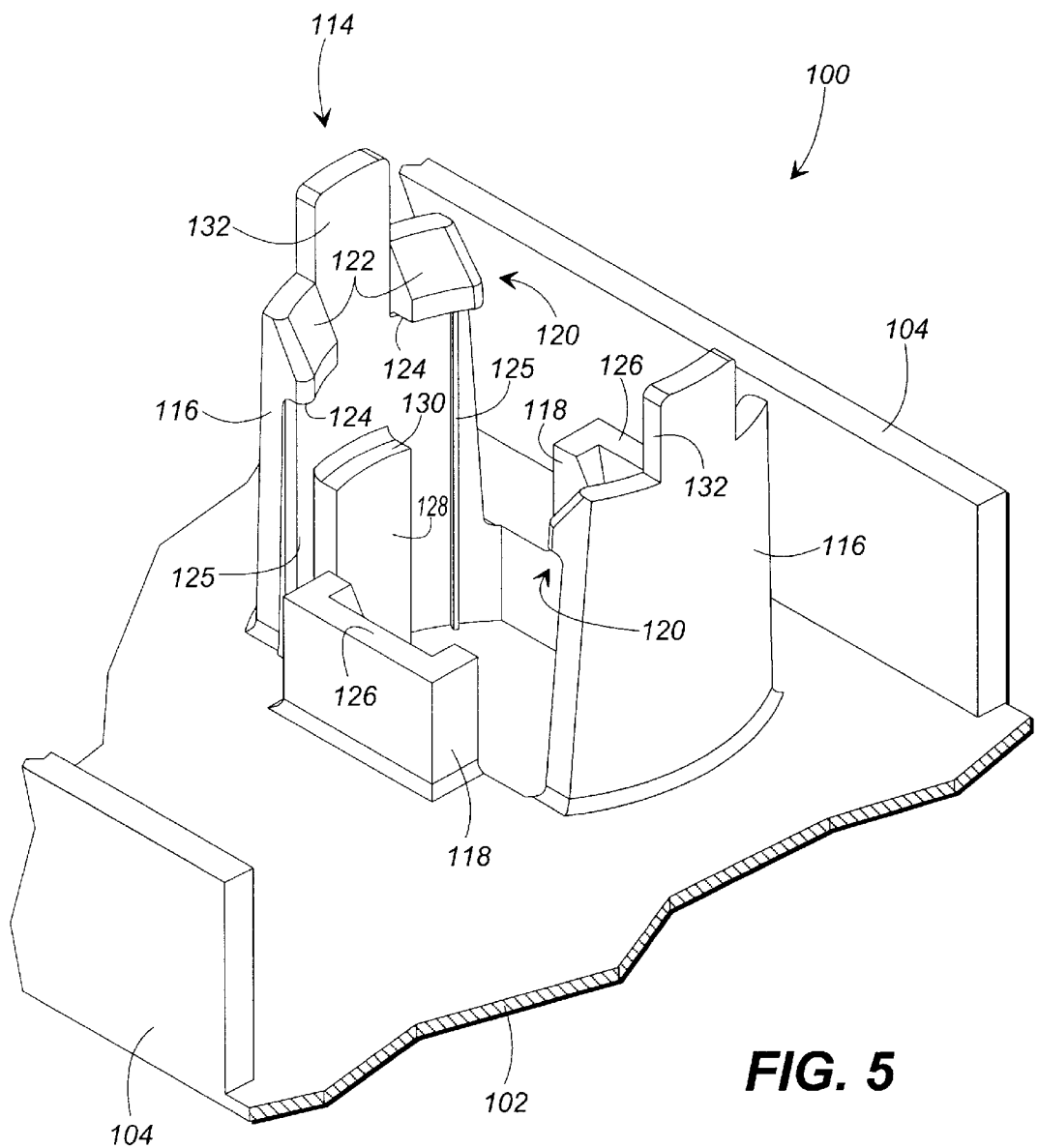
FIG. 5 is close-up perspective view of an attachment mechanism of the coupling panel shown in FIGS. 3–4.
Figure 6:
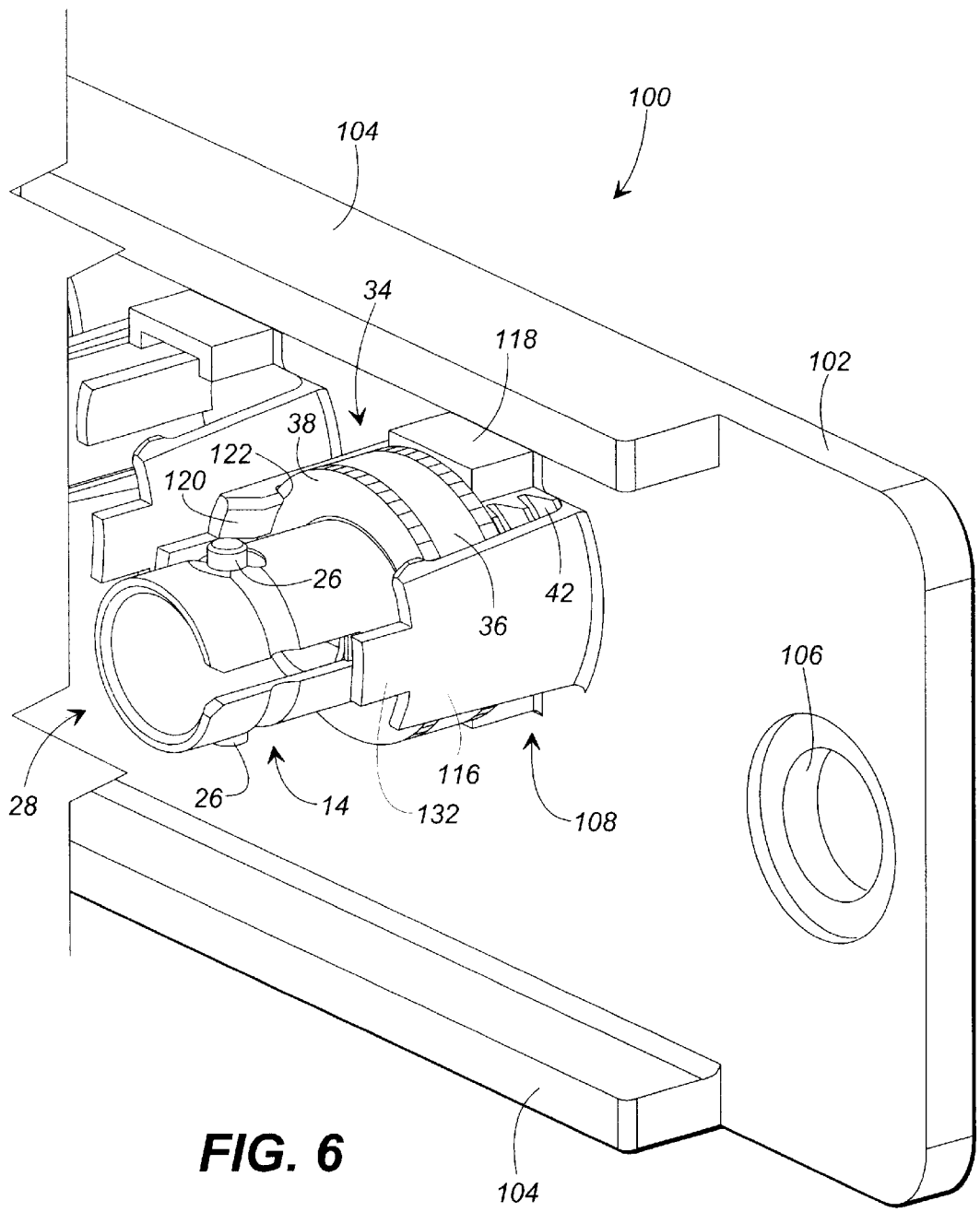
FIG. 6 is a partial rear perspective view of the coupling panel of FIGS. 3–4, shown with a connector coupler inserted therein.
Figure 7:
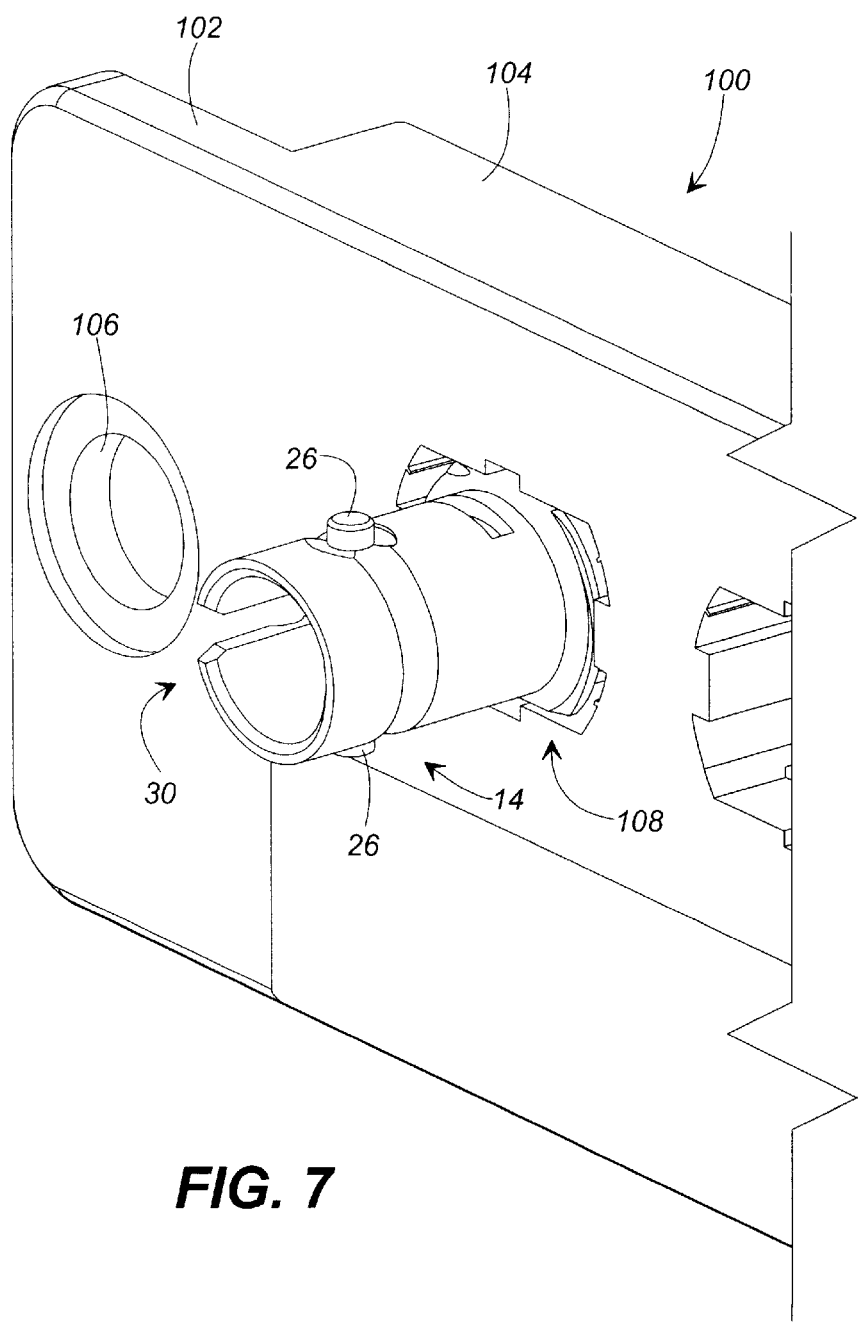
FIG. 7 is a partial front perspective view of the coupling panel and connector coupler shown in FIG. 6.

FIG. 4 is a rear perspective view of the coupling panel 100 shown in FIG. 3. As indicated in this figure, the coupling panel 100 includes a plurality of coupler attachment mechanisms 114. In particular, one coupler attachment mechanism 114 is provided for each opening 108. FIG. 5 shows one such coupler attachment mechanism 114 in enlarged detail. As illustrated in this figure, the coupler attachment mechanism 114 comprises opposed latch arms 116 and independently formed lands 118 that are formed integrally with the base portion 102. As is discussed in more detail below, the latch arms 116 and the lands 118 together secure a connector coupler 14 (FIG. 1) within the coupler opening 108 so that two optical fiber connectors can be coupled therein (FIGS. 6–7). Preferably, each of the opposed latch arms 116 is formed unitarily with the base portion 102 and therefore is composed of a resilient polymeric material. Although depicted as extending outwardly from the rear side of the base portion 102, normally arranged in this orientation, the latch arms 116 alternatively can extend from the front side of the base portion 102, if desired. The determination as to which side the latch arms 116 extend normally depends upon aesthetic concerns as well as standardized spatial requirements for cooperation between the panel 100 and the coupler. When positioned on the rear side of the base portion 102, the latch arms 116 typically extend farther than the flanges 104, although it will be understood that an alternative arrangement is feasible. As is further shown in FIG. 5, each of the latch arms 116 includes at least one retainer hook 120. Each retainer hook 120 extends inwardly from a distal end of each of the latch arms 116. In a preferred embodiment, each retainer hook 120 comprises an oblique outer surface 122 and a substantially planar contact surface 124 that faces the base portion 102 of the coupling panel 100. The contact surfaces 124 are adapted to be placed in contact with the annular ring 34 or other surface provided on the connector coupler 14 to retain the coupler in place within its coupler opening 108 (FIGS. 6–7). Moreover, each latch arm 116 preferably includes ribs 125. When provided, these ribs 125 typically extend longitudinally along the length of the inside of each latch arm 116 to ensure contact with the periphery of the connector coupler and reduce play in the fit between the coupler and the attachment mechanism 114.

Normally, the independently formed lands 118 are substantially rectilinear in shape. As shown most clearly in FIG. 5, the lands 118 normally are substantially shorter than the opposed latch arms 116 such that, when the connector coupler 14 is attached to the coupling panel 100, the annular ring 34 or other surface of the connector coupler can come into contact with a top surface 126 of each of the lands 118. In particular, the top surfaces 126 can come into abutment with the second side 40 of the connector coupler annular ring 34, as shown in FIG. 6. Together with the retainer hooks 120, the lands 118 retain the connector coupler 14 in place by securing its annular ring 34. To increase the strength of this hold on the connector coupler 14 and maintain its proper alignment, the opposed latch arms 116 typically further include integrally formed lands 128 which, like the lands 118, are provided with top surfaces 130. In addition, the opposed latch arms 116 normally include finger tabs 132. As is discussed below, these finger tabs 132 facilitate removal of the connector coupler 14 from its coupler opening 108.

The primary components of the coupling panel 100 having been described above, the present disclosure will now focus upon use of the coupling panel 100 in association with coupling elements such as a connector coupler. FIGS. 6 and 7 show a connector coupler 14 similar to that as described in the discussion of the prior art connected to the coupling panel 100 through a coupler opening 108. As is indicated most clearly in FIG. 6, the annular ring 34 of the connector coupler 14 is held by the ribs 125 of the latch arms 116 between the retainer hooks 120 of the latch arms and the independently formed lands 118. To connect the connector coupler 14 to the coupling panel 100 in this fashion, the connection coupler simply is inserted into the coupling panel by passing an end 30 of the connector coupler through the selected coupler opening 108. Normally, the second end 30 of the connector coupler 14 is inserted through the opening 108 from the rear side of the coupling panel 100 through to the front side of the coupling panel as indicated in FIG. 7.

As the connector coupler 14 is urged forwardly, the annular ring 34 makes contact with the oblique outer surfaces 122 of the retainer hooks 120 and forces the opposed latch arms 116 outwardly until the annular ring 34 snaps into place within the coupler attachment mechanism 114 between the retainer hooks 120 and the lands 118. The attachment mechanism 14 therefore may be said to provide for snap-fitting of the coupler 14. Once held within the coupler attachment mechanism 114, the connector coupler 14 can be used to couple to optical fiber connectors such as those depicted in FIGS. 1 and 2 in a manner conventional in the art.

If the operator desires to remove the connector coupler 14 from the coupling panel 100, the operator can simply pull the opposed latch arms 116 in a direction opposite and away from each other by grasping the finger tabs 132 provided on the distal ends of each latch arm. Once the opposed latch arms 116 have been pulled apart to the extent to which its annular ring 34 can pass between the opposed retainer hooks 120 of the latch arms 116, the connector coupler 14 can be removed from the coupling panel 100 by simply pushing on the second end 30 of the connector coupler until the connector coupler has been passed back through its coupler opening 108.

While preferred embodiments of the invention have been disclosed in detail in the foregoing description and drawings, it will be understood by those skilled in the art that variations and modifications thereof can be made without departing from the spirit and scope of the invention as set forth in the following claims. In particular, it is to be appreciated that the disclosure of the present invention is directed toward a coupling panel and coupling system that is not limited to use with any particular optical fiber connection elements.

What is claimed is:

1. A coupling panel for retaining one or more optical fiber couplers, said coupling panel comprising:
   a substantially planar base portion having a front side and a rear side;
   a plurality of coupler openings provided in said base portion and extending from one of said sides of said base portion, each coupler opening being sized and configured to receive an optical fiber connector coupler therethrough; and
   a plurality of coupler attachment mechanisms, one coupler attachment mechanism being positioned at each of said coupler openings, each coupler attachment mechanism being sized and configured to releasably hold the optical fiber connector coupler.

2. The panel of claim 1, wherein each of said coupler attachment mechanism includes a pair of opposed latch arms which are adapted to grasp the optical fiber connector coupler.

3. The panel of claim 2, wherein each latch arm includes a finger tab that facilitates removal of the connector coupler from said coupler attachment mechanism.

4. The panel of claim 2, wherein said opposed latch arms extend outwardly from the rear side of said coupling panel.

5. The panel of claim 2, wherein each latch arm includes at least one latch hook that is adapted to physically grasp the connector coupler.

6. The panel of claim 5, wherein each latch hook includes an oblique outer surface which facilitates insertion of the connector coupler.

7. The panel of claim 6, wherein each latch hook further includes a contact surface that is adapted to contact the connector coupler.

8. The panel of claim 2, wherein each said latch arm includes at least one land, each land having a top surface that is adapted to contact the connector coupler.

9. The panel of claim 2, wherein each said latch arm includes at least one rib adapted to contact the periphery of the connector coupler.

10. The panel of claim 2, wherein each said latch arm is formed integrally with said base portion.

11. The panel of claim 1, wherein said coupler attachment mechanism includes opposed lands, each land having a top surface that is adapted to contact the connector coupler.

12. A coupling panel for retaining one or more optical fiber couplers, said coupling panel comprising:
    a substantially planar base portion having a front side and a rear side;
    a plurality of coupler openings provided in said base portion and extending from said rear side to said front side, each coupler opening being sized and configured to receive an optical fiber connector coupler therethrough; and
    a plurality of coupler attachment mechanisms, one coupler attachment mechanism being positioned at each of said coupler openings, each coupler attachment mechanism including at least one latch arm which grasps the connector coupler and at least one land that supports the grasped connector coupler.

13. The panel of claim 12, wherein said at least one latch arm extends outwardly from the rear side of said coupling panel.

14. The panel of claim 12, wherein said at least one latch arm includes a finger tab that facilitates removal of the connector coupler from said coupler attachment mechanism.

15. The panel of claim 12, wherein said at least one latch arm includes at least one latch hook that is adapted to physically grasp the connector coupler.

16. The panel of claim 15, wherein each latch hook includes an oblique outer surface which facilitates insertion of the connector coupler.

17. The panel of claim 16, wherein each latch hook further includes a contact surface that is adapted to contact the connector coupler.

18. The panel of claim 12, wherein each lateral latch arm further includes at least one land, each land having a top surface that is adapted to contact the connector coupler.

19. The panel of claim 12, wherein each latch arm includes at least one rib adapted to contact the periphery of the connector coupler.

20. The panel of claim 12, wherein each said latch arm is formed integrally with said base portion.

21. An optical fiber connector coupling system, comprising:
    an optical fiber connector coupler having first and second ends and an annular ring disposed about said coupler between said first and second ends; and
    a coupling panel that comprises a substantially planar base portion having a front side and a rear side, a plurality of coupler openings provided in said base portion that extend from said rear side to said front side and which are sized and configured to receive said connector coupler therethrough, and a plurality of coupler attachment mechanisms, one coupler attachment mechanism being positioned at each of said coupler openings and being sized and configured to releasably hold said connector coupler.

22. The system of claim 21, wherein said coupler attachment mechanism includes a pair of opposed latch arms which grasp said connector coupler.

23. The panel of claim 22, wherein said opposed lateral latch arms extend outwardly from the rear side of said coupling panel.

24. The panel of claim 22, wherein each opposed lateral latch arm includes at least one latch hook.

25. The panel of claim 22, wherein each latch arm includes at least one rib adapted to contact the periphery of the connector coupler.

26. The panel of claim 22, wherein each said latch arm is formed integrally with said base portion.

27. The panel of claim 21, wherein said coupler attachment mechanism includes opposed lands.

* * * * *